United States Patent
Jang et al.

(10) Patent No.: US 12,255,530 B2
(45) Date of Patent: Mar. 18, 2025

(54) DEVICE AND METHOD FOR CONTROLLING LLC RESONANCE CONVERTER USING SWITCHING DUTY CONTROL

(71) Applicants: HYUNDAI MOTOR COMPANY, Seoul (KR); KIA CORPORATION, Seoul (KR)

(72) Inventors: Hui Sung Jang, Hwaseong-si (KR); Dong Gyun Woo, Hwaseong-si (KR); Chul Soon Kim, Guri-si (KR); Jee Heon Kim, Hwaseong-si (KR); Sung Uk Park, Busan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 247 days.

(21) Appl. No.: 17/868,188

(22) Filed: Jul. 19, 2022

(65) Prior Publication Data
US 2023/0037590 A1 Feb. 9, 2023

(30) Foreign Application Priority Data
Aug. 3, 2021 (KR) .......................... 10-2021-0102161

(51) Int. Cl.
*H02M 3/335* (2006.01)
*H02M 3/00* (2006.01)

(52) U.S. Cl.
CPC .......... *H02M 3/01* (2021.05); *H02M 3/33507* (2013.01)

(58) Field of Classification Search
CPC ............ H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 1/12; H02M 3/3155; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 7/1552; H02M 7/1623; H02M 1/4225; H02M 3/073; H02M 3/10; H02M 3/135; H02M 3/137; H02M 7/10; H02M 7/00; H02M 7/06; H02M 7/064; H02M 7/068; Y02B 70/1491;
(Continued)

(56) References Cited
U.S. PATENT DOCUMENTS 9,042,125 B1* 5/2015 Wambsganss ...... H02M 3/3376
363/21.02
9,537,408 B2* 1/2017 Hirano ..................... B60L 3/003
(Continued)

*Primary Examiner* — Fred E Finch, III
*Assistant Examiner* — Nusrat Quddus
(74) *Attorney, Agent, or Firm* — MCDONNELL BOEHNEN HULBERT & BERGHOFF LLP

(57) ABSTRACT

A method for controlling an LLC resonance converter controls a converter through the steps of detecting parameter values related to operation of the converter, determining a switching duty of the converter on the basis of the detected parameter values, and controlling the converter with the determined switching duty to improve nonlinearity of a gain curve of the converter, thereby reducing output current ripples and achieving low-gain output.

7 Claims, 14 Drawing Sheets

(58) Field of Classification Search
CPC ..... G05F 1/30; G05F 1/33; G05F 1/32; G05F 1/34; G05F 1/38; G05F 1/52; H02J 7/12
See application file for complete search history.

(56) References Cited

U.S. PATENT DOCUMENTS

| | | | | |
|---|---|---|---|---|
| 9,660,543 | B2* | 5/2017 | Takagi | H02M 3/33576 |
| 9,948,190 | B2* | 4/2018 | Adragna | H02M 3/335 |
| 10,171,003 | B1* | 1/2019 | Adragna | H02M 3/33571 |
| 10,411,608 | B2* | 9/2019 | Ye | H02M 3/01 |
| 11,005,379 | B1* | 5/2021 | Deboy | H02M 3/33571 |
| 11,356,028 | B2* | 6/2022 | Cayford | H02M 1/40 |
| 11,387,739 | B2* | 7/2022 | Adragna | H02M 3/33571 |
| 12,034,365 | B2* | 7/2024 | Jaksa | H02M 3/01 |
| 2013/0003430 | A1* | 1/2013 | Reddy | H02M 3/01 363/74 |
| 2014/0091718 | A1* | 4/2014 | Brinlee | H05B 45/39 363/16 |
| 2014/0160805 | A1* | 6/2014 | Oh | H02M 1/4258 363/21.02 |
| 2014/0369081 | A1* | 12/2014 | Maniktala | H02M 3/3376 363/21.02 |
| 2017/0104417 | A1* | 4/2017 | Hung | H02M 3/3376 |
| 2018/0048236 | A1* | 2/2018 | Wang | H02M 3/33507 |
| 2019/0044430 | A1* | 2/2019 | Moon | H02M 3/3376 |
| 2019/0356230 | A1* | 11/2019 | Yeh | H02M 1/08 |
| 2020/0007043 | A1* | 1/2020 | Miao | H02M 3/01 |
| 2020/0007044 | A1* | 1/2020 | Sato | H02M 1/36 |
| 2022/0158536 | A1* | 5/2022 | Jaksa | H02M 3/01 |
| 2023/0126710 | A1* | 4/2023 | Liu | H02M 1/0048 363/13 |

* cited by examiner

DEVICE AND METHOD FOR CONTROLLING LLC RESONANCE CONVERTER USING SWITCHING DUTY CONTROL

CROSS REFERENCE TO RELATED APPLICATIONS

This application claims the priority of Korean Patent Application No. 10-2021-0102161, filed on Aug. 3, 2021 in the Korean Intellectual Property Office, the disclosure of which is incorporated herein by reference.

BACKGROUND

1. Field

The present disclosure relates to a device and method for controlling an LLC resonance converter, and more specifically, to an LLC resonance converter having improved nonlinear characteristics of an input/output voltage gain characteristic curve.

2. Description of the Related Art

Eco-friendly vehicles that charge a battery serving as an energy source of a driving motor, such as electric vehicles and plug-in hybrid vehicles, include an on-board charger for converting external AC power into output DC power for charging the battery.

In general, the on-board charger includes a power factor correction circuit for correcting a power factor of external AC power to output DC power and a DC-DC converter for converting the DC output of the power factor correction circuit into a DC voltage for charging a battery. Here, an LLC resonance converter using LC resonance may be employed as a DC-DC converter.

Characteristics of the LLC resonance converter are determined by a resonance frequency that is determined by two inductors and a single capacitor corresponding to a resonance tank around a transformer. The LLC resonance converter has the advantage of considerably reducing switching loss and diode loss because it uses resonance current generated by two inductors and a single capacitor. On the other hand, input/output relation of the LLC resonance converter is determined by controlling a switching frequency instead of controlling a duty of a switching element included therein, and thus an input/output voltage gain characteristic curve is nonlinear and it is difficult to control the LLC resonance converter.

It will be understood that the above matters described in the related art are merely for promotion of understanding of the background of the disclosure and should not be recognized as prior art well-known to those skilled in the art.

SUMMARY

Therefore, the present disclosure has been made in view of the above problems, and it is an object of the present disclosure to provide a device and method for controlling an LLC resonance converter, which can improve nonlinearity of a gain curve of the LLC resonance converter and reduce output current ripples by changing and controlling a switching duty value as well as a switching frequency in control of switches included in the LLC resonance converter.

It is another object of the present disclosure to provide a device and method for controlling an LLC resonance converter, which can calculate a duty value capable of improving nonlinearity of a gain curve of the LLC resonance converter using a gain or a switching frequency of the LLC resonance converter and controlling the converter using the duty value to allow low-gain output and secure low-load output.

Technical tasks obtainable from the present disclosure are not limited to the above-mentioned technical task and other unmentioned technical tasks can be clearly understood from the following description by those having ordinary skill in the technical field to which the present disclosure pertains.

In accordance with an aspect of the present disclosure, the above and other objects can be accomplished by the provision of a method for controlling an LLC resonance converter, including detecting a parameter value related to operation of the converter, determining a switching duty of the converter on the basis of the detected parameter value, and controlling the converter with the determined switching duty.

The parameter value may include an input voltage and an output voltage of the converter.

The determining of the switching duty of the converter may include calculating a gain value of the converter using the input voltage and the output voltage, applying a scaling value and an offset value to the calculated gain value to calculate a gain corrected value, and determining the switching duty from the gain corrected value using a predetermined function.

The determined switching duty may have a first constant value when the gain value is equal to or less than a first reference value, have a second constant value when the gain value is equal to or greater than a second reference value, and have a value on a straight line passing through the first constant value and the second constant value when the gain value is greater than the first reference value and less than the second reference value, and the first constant value and the second constant value may be different from each other.

The determined switching duty may have a first constant value when the gain value is equal to or less than a first reference value, have a second constant value when the gain value is equal to or greater than a second reference value, and have a value on a curve passing through the first constant value and the second constant value when the gain value is greater than the first reference value and less than the second reference value, and the first constant value and the second constant value may be different from each other.

The parameter value may be a switching frequency of the converter.

The determining of the switching duty of the converter may include applying a scaling value and an offset value to the switching frequency to calculate a switching frequency corrected value and determining the switching duty from the switching frequency corrected value using a predetermined function.

The determined switching duty may have a third constant value when the switching frequency is equal to or less than a third reference value, have a fourth constant value when the switching frequency is equal to or greater than a fourth reference value, and have a value on a straight line passing through the third constant value and the fourth constant value when the switching frequency is greater than the third reference value and less than the fourth reference value, and the third constant value and the fourth constant value may be different from each other.

The scaling value and the offset value may be constant values determined by at least one of a current value and a resistance value applied to the converter.

The scaling value and the offset value may be determined by finding a switching duty value for eliminating nonlinearity of a gain curve of the converter such that the gain curve has linear characteristics and finding a scaling value and an offset value for deriving the switching duty value through repeated simulations.

In accordance with another aspect of the present disclosure, there is provided a device for controlling an LLC resonance converter, including a converter capable of converting a voltage according to control of switching elements included in the converter and a duty variable controller for detecting a parameter value related to operation of the converter and determining a switching duty of the switching elements on the basis of the detected parameter value.

The duty variable controller may include a parameter detector for detecting the parameter value, a parameter corrector for applying a scaling value and an offset value to the detected parameter value, and a duty calculator for determining the switching duty from parameter value to which the scaling value and the offset value have been applied using a predetermined function.

The parameter value may include an input voltage and an output voltage of the converter, and parameter corrector may divide the output voltage by the input voltage to calculate a gain value and apply the scaling value and the offset value to the calculated gain value.

The determined switching duty may have a first constant value when the gain value is equal to or less than a first reference value, have a second constant value when the gain value is equal to or greater than a second reference value, and have a value on a curve passing through the first constant value and the second constant value when the gain value is greater than the first reference value and less than the second reference value, and the first constant value and the second constant value may be different from each other.

The parameter value is a switching frequency of the converter, the determined switching duty may have a third constant value when the switching frequency is equal to or less than a third reference value, have a fourth constant value when the switching frequency is equal to or greater than a fourth reference value, and have a value on a straight line passing through the third constant value and the fourth constant value when the switching frequency is greater than the third reference value and less than the fourth reference value, and the third constant value and the fourth constant value may be different from each other.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

The present disclosure relates to a device and method for controlling an LLC resonance converter by varying a switching duty. Hereinafter, the device and method for controlling an LLC resonance converter will be simply referred to as a "converter control device" and a "converter control method".

Figure 1:
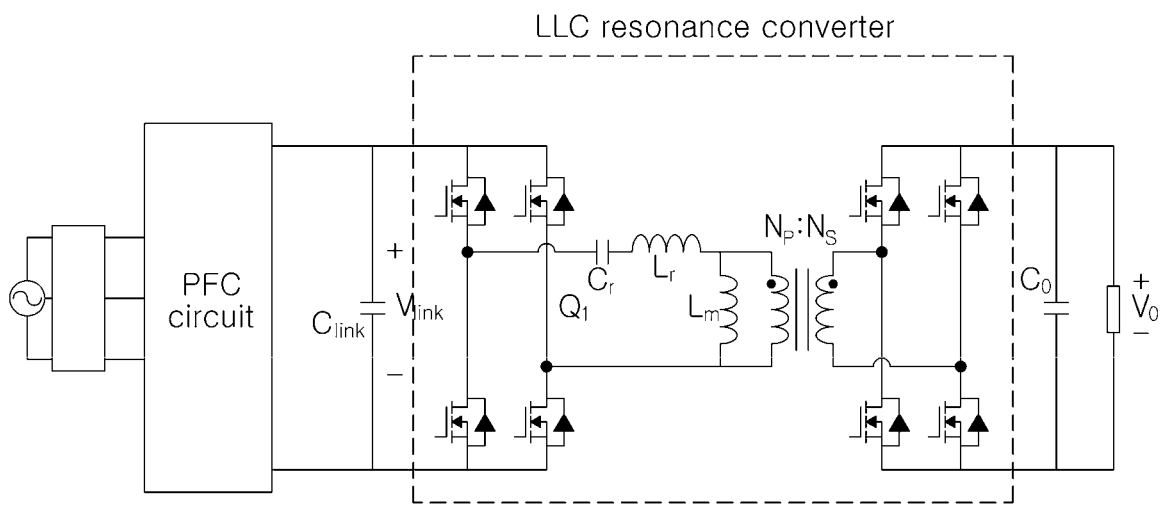
FIG. 1 is a diagram illustrating an example of an LLC resonance converter circuit structure to aid in understanding the present disclosure.

Recently, technical development of chargers and converters for vehicles has focused on efficiency increase and miniaturization. An LLC resonance converter is one of the most widely used resonance converters. This LLC resonance converter can minimize switching loss through resonance current according to L and C resonance by performing complementary switching with a fixed duty of 50% and changing a switching frequency. FIG. 1 is a diagram illustrating an LLC resonance converter circuit structure to aid in understanding the present disclosure. In the figure, a part indicated by a dotted line corresponds to an LLC resonance converter.

Figure 2:
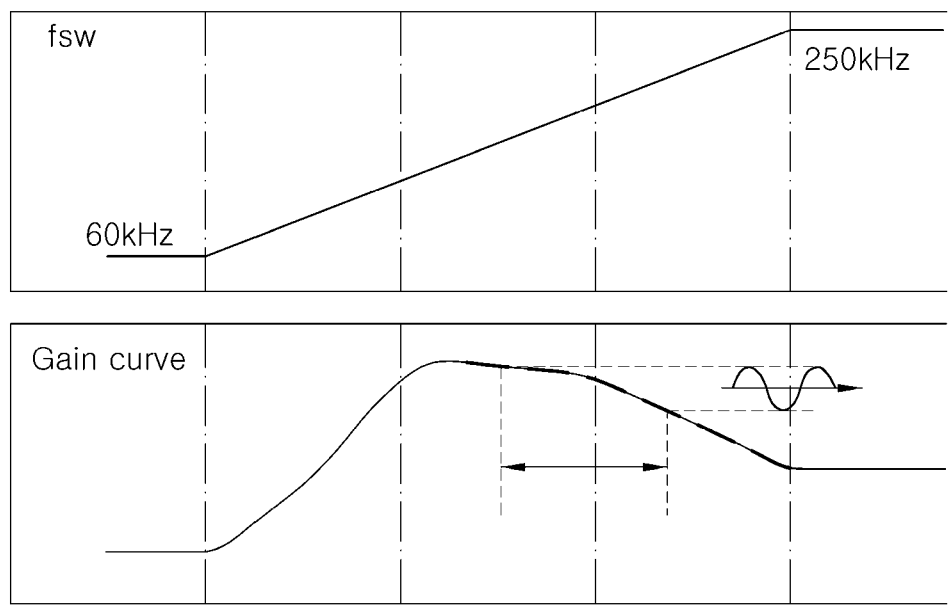
FIG. 2 is a diagram illustrating nonlinearity of a gain curve according to change in a switching frequency in a conventional converter.

The LLC resonance converter is widely applied to industrial fields in which input/output ranges are not wide. If the LLC resonance converter is used for an industrial application with wide input/output ranges, an input/output voltage gain curve has nonlinear characteristics and thus it is very difficult to control the converter. In this case, it is not possible to perform proper output voltage/current control, affecting durability of converter elements and damaging the converter elements. FIG. 2 is a diagram illustrating nonlinearity of a gain curve according to change in a switching frequency in a conventional converter. Referring to FIG. 2, it can be ascertained that the gain curve has nonlinear characteristics as the switching frequency $f_{sw}$ increases and link voltage ripples are generated in a section having the nonlinear characteristics.

The present disclosure provides a method for improving nonlinear characteristics of the input/output voltage gain curve of the LLC resonance converter.

Figure 3:
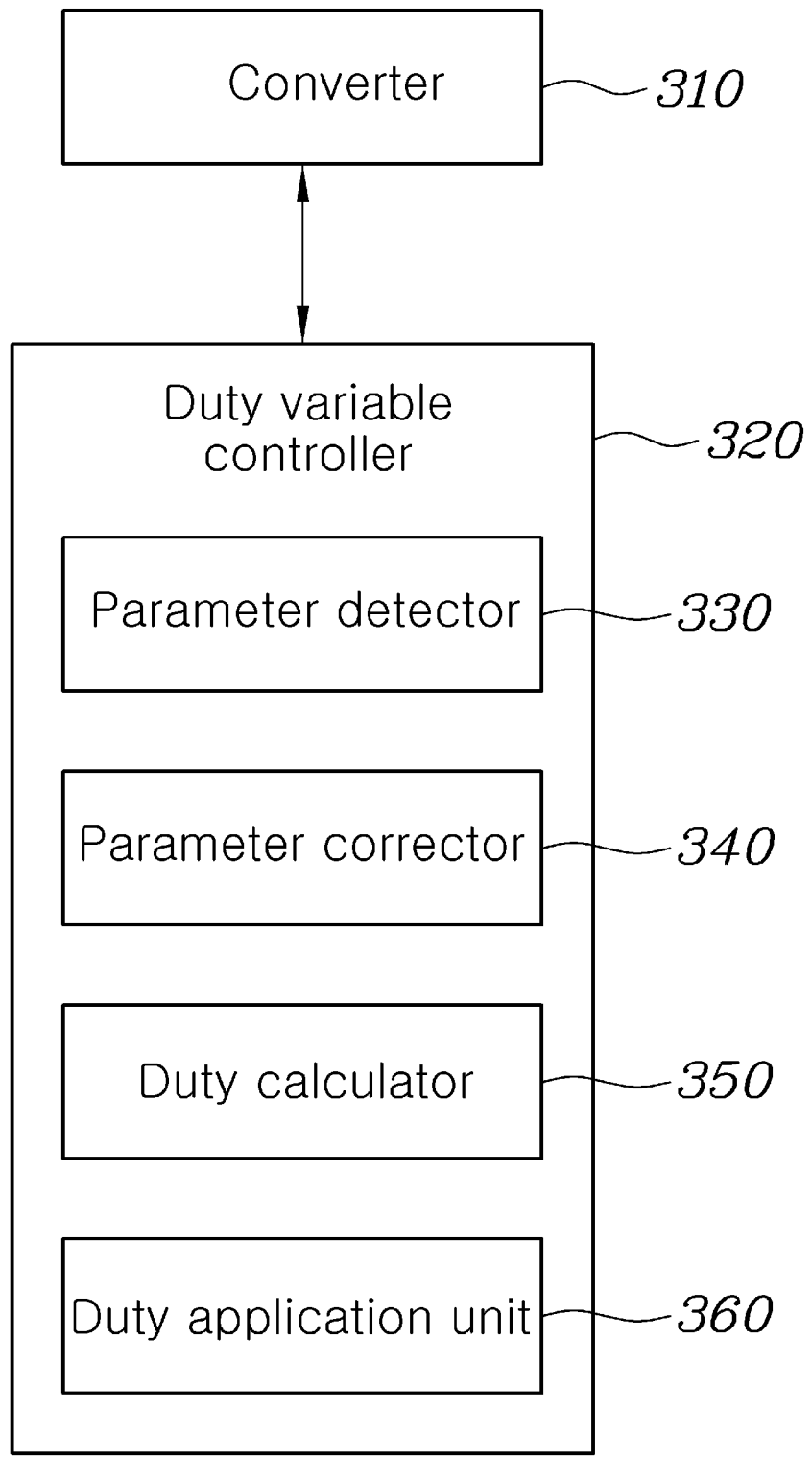
FIG. 3 is a diagram illustrating a configuration of a converter control device according to an embodiment of the present disclosure.

FIG. 3 is a diagram illustrating a configuration of a converter control device according to an embodiment of the present disclosure.

Referring to FIG. 3, the converter control device according to an embodiment of the present disclosure includes a converter 310 and a duty variable controller 320.

The converter 310 converts DC output of a power factor correction circuit (not shown) that corrects the power factor of external AC power and outputs the external AC power as DC power into a DC voltage for charging a battery. The converter 310 according to an embodiment of the present disclosure is an LLC resonance converter using LC resonance. Characteristics of the LLC resonance converter are determined by a resonance frequency that is determined by two inductors and a single capacitor corresponding to a resonance tank around a transformer.

The duty variable controller 320 detects parameters related to the converter 310, calculates a switching duty of the converter 310 on the basis of the detected parameters, and controls the converter 310 to operate with the calculated switching duty. The duty variable controller 320 may include a parameter detector 330, a parameter corrector 340, a duty calculator 350, and a duty application unit 360.

The parameter detector 330 detects parameters related to operation of the converter 310. In an embodiment of the present disclosure, the parameter detector 330 may detect an input voltage applied to the converter and an output voltage output from the converter as parameters related to operation of the converter. In another embodiment of the present disclosure, the parameter detector 330 may detect a switching frequency of the converter 310 as a parameter related to operation of the converter.

The parameter corrector 340 appropriately corrects a parameter value detected by the parameter detector 330 such that a switching duty value can be calculated from the detected parameter value. In an embodiment of the present disclosure, the parameter corrector 340 may correct a parameter value by applying a scaling value and an offset value to the parameter value. More specifically, the parameter corrector 340 may multiply a detected parameter value by a scaling value and add an offset value to the multiplication result to derive a corrected parameter value.

In an embodiment of the present disclosure, the scaling value and the offset value may be constants predetermined through tests in order to derive a duty value for eliminating nonlinearity of a gain curve of the converter 310 on the basis of parameters detected by the parameter detector 330. More specifically, the scaling value and the offset value may be determined by finding a duty value for eliminating nonlinearity of the gain curve of the converter 310 such that the gain curve has linear characteristics and finding a scaling value and an offset value by which the duty value can be derived through repeated simulations.

In an embodiment, the scaling value and the offset value may be obtained through simulations and tests for setting a duty for a gain value such that a gain of a section at which a link voltage changes on a gain curve representing a gain according to a switching frequency of the converter 310 is detected, a 50% duty is applied at a gain point P1 at which nonlinearity of the gain starts, and a reduced duty is applied at a gain point P2.

In another embodiment of the present disclosure, the scaling value and the offset value may be constants selected depending on an input current and a load of the converter 310.

The duty calculator 350 determines a switching duty of the converter 310 by applying a parameter value corrected by the parameter corrector 340 to a predetermined function.

In an embodiment of the present disclosure, the predetermined function outputs different function values according to a corrected parameter value. For example, the predetermined function may output a first constant value as a duty value if the corrected parameter value is equal to or less than a first reference value, output a second constant value as a duty value if the corrected parameter value is equal to or greater than a second reference value, and output a constant value varying according to the corrected parameter value as a duty value if the corrected parameter value is equal to or greater than the first reference value and equal to or less than the second reference value. For example, the predetermined function according to an embodiment of the present disclosure may output 0.5 as a duty value if the corrected parameter value is equal to or less than the first reference value, output 0.2 as a duty value if the corrected parameter value is equal to or greater than the second reference value, and output a constant such as 0.45, 0.3, or 0.25 according to the corrected parameter value as a duty value if the corrected parameter value is equal to or greater than the first reference value and equal to or less than the second reference value.

The switching duty determined by the duty calculator 350 may be represented by a line connecting a duty value (first constant value) at the first reference value to a duty value (second constant value) at the second reference value on a graph having a corrected parameter value as an x axis and a duty value as a y axis when the corrected parameter value is equal to or greater than the first reference value and equal to or less than the second reference value.

In an embodiment of the present disclosure, the switching duty determined by the duty calculator 350 may be represented by a straight line defined as a linear function which connects a duty value (first constant value) at the first reference value to a duty value (second constant value) at the second reference value on a graph having a corrected parameter value as an x axis and a duty value as a y axis when the corrected parameter value is equal to or greater than the first reference value and equal to or less than the second reference value. Accordingly, when the corrected parameter value is equal to or greater than the first reference value and equal to or less than the second reference value, the duty value derived by the function may gradually decrease or increase as the corrected parameter value increases.

In another embodiment of the present disclosure, the switching duty determined by the duty calculator 350 may be represented by a curve defined as a quadratic function which connects a duty value (first constant value) at the first reference value to a duty value (second constant value) at the second reference value on a graph having a corrected parameter value as an x axis and a duty value as a y axis when the corrected parameter value is equal to or greater than the first reference value and equal to or less than the second reference value.

The duty application unit 360 controls the converter 310 using the switching duty value determined by the duty calculator 350. In an embodiment of the present disclosure, the duty application unit 360 may generate a pulse width modulation (PWM) signal having the determined switching duty value and transmit the generated PWM signal to a switching element of the converter 310 to control the converter 310 with the determined switching duty value.

Hereinafter, operation of the converter control device according to an embodiment of the present disclosure will be described in more detail with reference to FIG. 4 to FIG. 8.

Figure 4A:
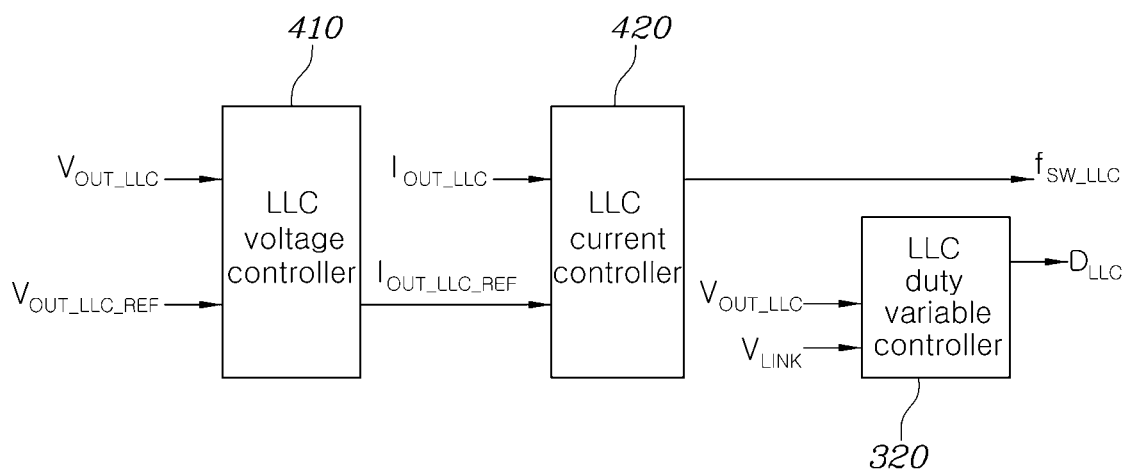
FIGS. 4A and 4B are diagrams illustrating a configuration of a duty variable controller according to an embodiment of the present disclosure.
Figure 4B:
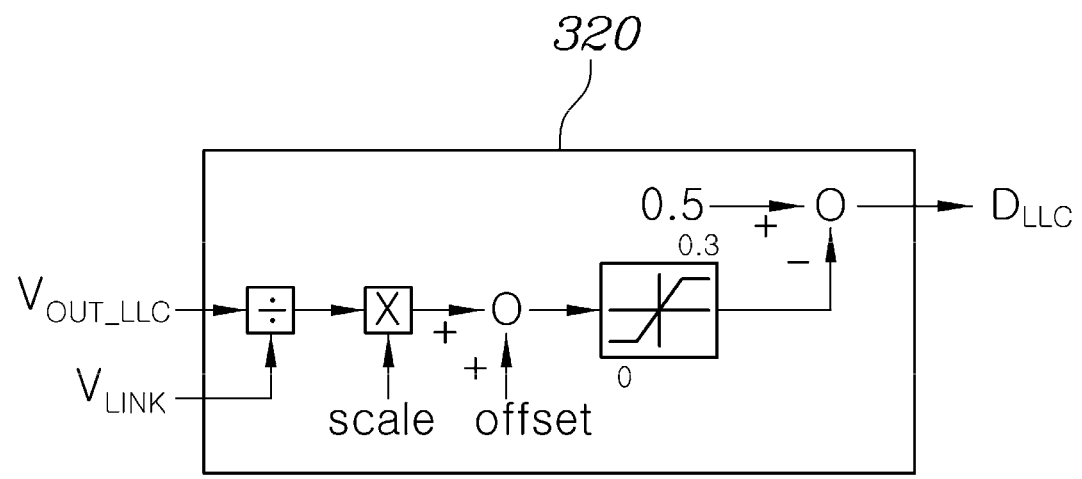

FIG. 4 is a diagram illustrating a configuration of the duty variable controller according to an embodiment of the present disclosure. FIG. 4A illustrates a voltage controller 410, a current controller 420, and the duty variable controller 320 of the converter 310 and FIG. 4B illustrates internal operation of the duty variable controller 320.

The voltage controller 410 and the current controller 420 are elements used to control a circuit device that converts power using switching elements such as a conventional converter and inverter. More specifically, the voltage controller 410 may receive an output voltage sensing value obtained by detecting an output voltage $V_{OUT\_LLC}$ of the LLC resonance converter 310 using a sensor or the like and an output voltage reference value $V_{OUT\_LLC\_REF}$ corresponding to a voltage to be output by the LLC resonance converter 310, and generate a specific output value $I_{OUT\_LLC\_REF}$ for minimizing an error between the output voltage sensing value and the output voltage reference value using a conventional controller such as a proportional integral (PI) or proportional integral differential (PID) controller. The current controller 420 may receive the output current reference value $I_{OUT\_LLC\_REF}$ provided by the voltage controller 410 and an output current sensing value $I_{OUT\_LLC}$ detected from an output terminal of the LLC resonance converter 310 through a sensor or the like and determine a switching frequency $f_{SW\_LLC}$ of a switching element in the LLC resonance converter 310 for minimizing an error between the output current sensing value and the output current reference value using a conventional controller such as a PI or PID controller.

The duty variable controller 320 may receive an output voltage $V_{OUT\_LLC}$ and an input voltage $V_{LINK}$ of the LLC resonance converter and determine a duty value $D_{LLC}$.

Referring to FIG. 4b, the duty variable controller 320 receives the output voltage $V_{OUT\_LLC}$ and the input voltage $V_{LINK}$ and calculates a gain (voltage gain value) by dividing the output voltage $V_{OUT\_LLC}$ by the input voltage $V_{LINK}$. The duty variable controller 320 scales the calculated voltage gain value using a scaling value and adds an offset value to the scaled value to calculate a gain corrected value.

The calculated gain corrected value is derived as a duty value through a predetermined function. In an embodiment of the present disclosure, the predetermined function outputs different function values according to the gain corrected value. For example, the predetermined function may output a first constant value as a duty value if the gain corrected value is equal to or less than a first reference value, output a second constant value as a duty value if the gain corrected value is equal to or greater than a second reference value, and output a constant value varying according to the gain corrected value as a duty value if the gain corrected value is equal to or greater than the first reference value and equal to or less than the second reference value. For example, the predetermined function according to an embodiment of the present disclosure may output 0.5 as a duty value if the gain corrected value is equal to or less than the first reference value, output 0.2 as a duty value if the gain corrected value is equal to or greater than the second reference value, and output a constant such as 0.45, 0.3, or 0.25 according to the gain corrected value as a duty value if the gain corrected value is equal to or greater than the first reference value and equal to or less than the second reference value.

The switching duty determined by the duty variable controller 320 may be represented by a line connecting a duty value (first constant value) at the first reference value to a duty value (second constant value) at the second reference value on a graph having a gain value as an x axis and a duty value as a y axis when the detected gain value is equal to or greater than the first reference value and equal to or less than the second reference value.

In an embodiment of the present disclosure, the switching duty determined by the duty variable controller 320 may be represented by a straight line connecting a duty value (first constant value) at the first reference value to a duty value (second constant value) at the second reference value on a graph having a gain corrected value as an x axis and a duty value as a y axis when the gain corrected value is equal to or greater than the first reference value and equal to or less than the second reference value, that is, the switching duty may be represented on a linear function graph. Accordingly, when the gain corrected value is equal to or greater than the first reference value and equal to or less than the second reference value, the duty value derived by the function may gradually decrease or increase as the gain corrected value increases.

Figure 5A:
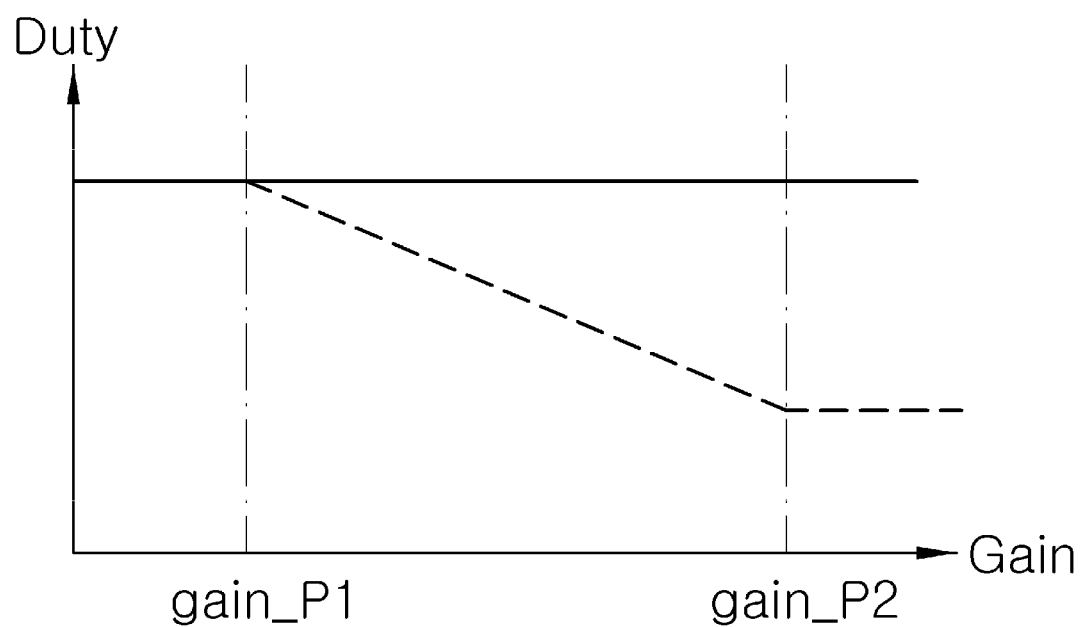
FIGS. 5A and 5B are diagrams illustrating a duty derived by the duty variable controller illustrated in FIG. 4 and a gain curve according thereto.
Figure 5B:
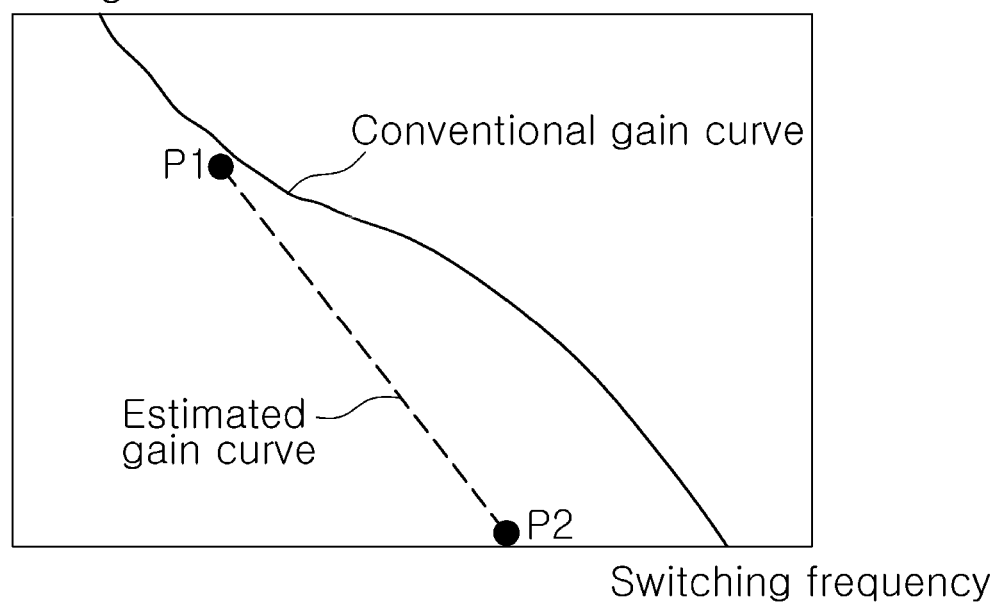

FIG. 5 shows a duty derived by the duty variable controller 320 illustrated in FIG. 4 and a gain curve according to the duty. FIG. 5A is a graph showing a switching duty value determined by the duty variable controller 320 illustrated in FIG. 4 according to a gain value and FIG. 5B shows a gain curve when a switch of the converter 310 is controlled using the switching duty value shown in FIG. 5A.

Referring to FIG. 5A, the switching duty value determined by the duty variable controller 320 according to an embodiment of the present disclosure is a constant value when a gain calculated from an input voltage and an output voltage detected by the duty variable controller 320 is equal to or less than a specific value gain_P1, is a constant value when the gain is equal to or greater than a specific value gain_P2, and is represented by a straight line connecting gain_P1 to gain_P2 when the gain is a value between gain_P1 and gain_P2. Here, constant values at gain_P1 and gain_P2 are different from each other. This means that switches of the converter 310 are controlled using different switching duties depending on detected gain values of the converter 310 instead of being controlled with a specific switching duty in the whole region of gain values. In this manner, a variable duty can be applied in control of the switches of the converter 310 to improve nonlinearity of the gain curve, as illustrated in FIG. 5B.

Figure 6A:
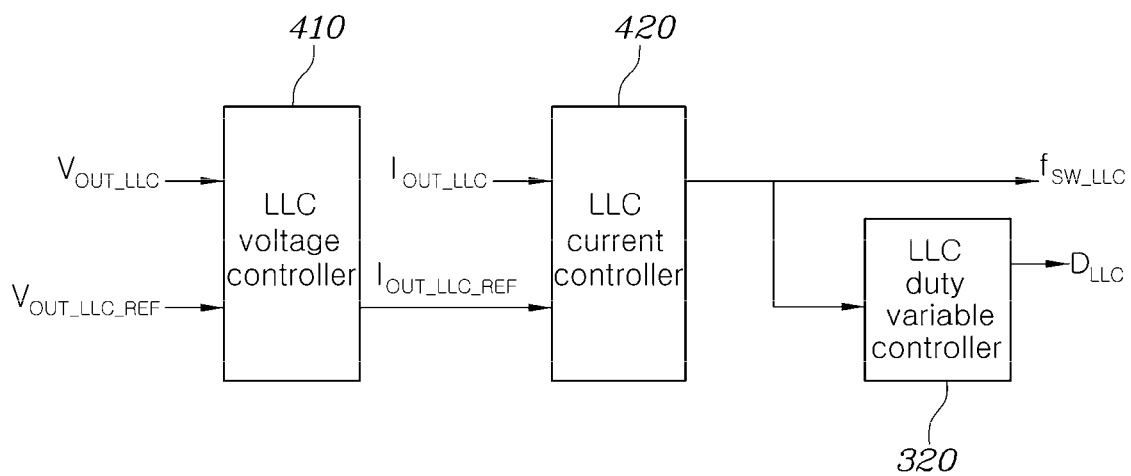
FIGS. 6A and 6B are diagrams illustrating a duty variable controller according to another embodiment of the present disclosure.
Figure 6B:
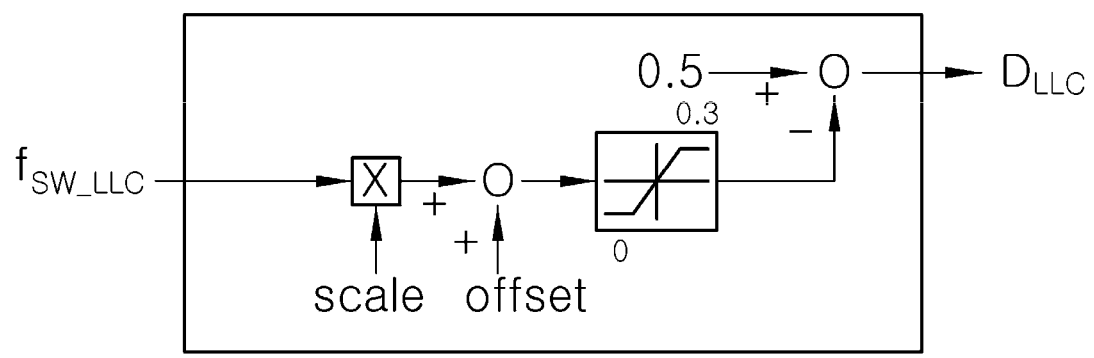

FIG. 6 is a diagram illustrating a configuration of a duty variable controller according to another embodiment of the present disclosure. FIG. 6A illustrates the voltage controller 410, the current controller 420, and the duty variable controller 320 of the converter 310 and FIG. 6B illustrates internal operation of the duty variable controller 320.

The voltage controller 410 and the current controller 420 are the same as those described in the above-described embodiment and they pertain to a conventional technology for controlling a switching element such that an output voltage of the LLC resonance converter 310 becomes a desired value (output voltage reference value), and thus additional description thereof is omitted.

The duty variable controller 320 may receive a switching frequency $f_{SW\_LLC}$ of switches in the converter 310, which is an output value of the current controller 420, and determine a duty value $D_{LLC}$.

Referring to FIG. 6B, the duty variable controller 320 scales the received switching frequency $f_{SW\_LLC}$ using a scaling value and adds an offset value thereto to calculate a switching frequency corrected value.

The calculated switching frequency corrected value is derived as a duty value through a predetermined function.

In an embodiment of the present disclosure, the predetermined function outputs different function values according to the switching frequency corrected value. For example, the predetermined function may output a first constant value as a duty value if the switching frequency corrected value is equal to or less than a first reference value, output a second constant value as a duty value if the switching frequency corrected value is equal to or greater than a second reference value, and output a constant value varying according to the switching frequency corrected value as a duty value if the switching frequency corrected value is equal to or greater than the first reference value and equal to or less than the second reference value. For example, the predetermined function according to an embodiment of the present disclosure may output 0.5 as a duty value if the switching frequency corrected value is equal to or less than the first reference value, output 0.2 as a duty value if the switching frequency corrected value is equal to or greater than the second reference value, and output a constant such as 0.45, 0.3, or 0.25 according to the switching frequency corrected value as a switching duty value if the switching frequency corrected value is equal to or greater than the first reference value and equal to or less than the second reference value.

The switching duty determined by the duty variable controller 320 may be represented by a line connecting a duty value (first constant value) at the first reference value to a duty value (second constant value) at the second reference value on a graph having a switching frequency value as an x axis and a duty value as a y axis when the switching frequency corrected value is equal to or greater than the first reference value and equal to or less than the second reference value.

In an embodiment of the present disclosure, the switching duty determined by the duty variable controller 320 may be represented by a straight line connecting a duty value (first constant value) at the first reference value to a duty value (second constant value) at the second reference value on a graph having a gain corrected value as an x axis and a duty value as a y axis when the switching frequency corrected value is equal to or greater than the first reference value and equal to or less than the second reference value, that is, the switching duty may be represented on a linear function graph. Accordingly, when the switching frequency corrected value is equal to or greater than the first reference value and equal to or less than the second reference value, the duty value derived by the function may gradually decrease or increase as the switching frequency corrected value increases.

Figure 7A:
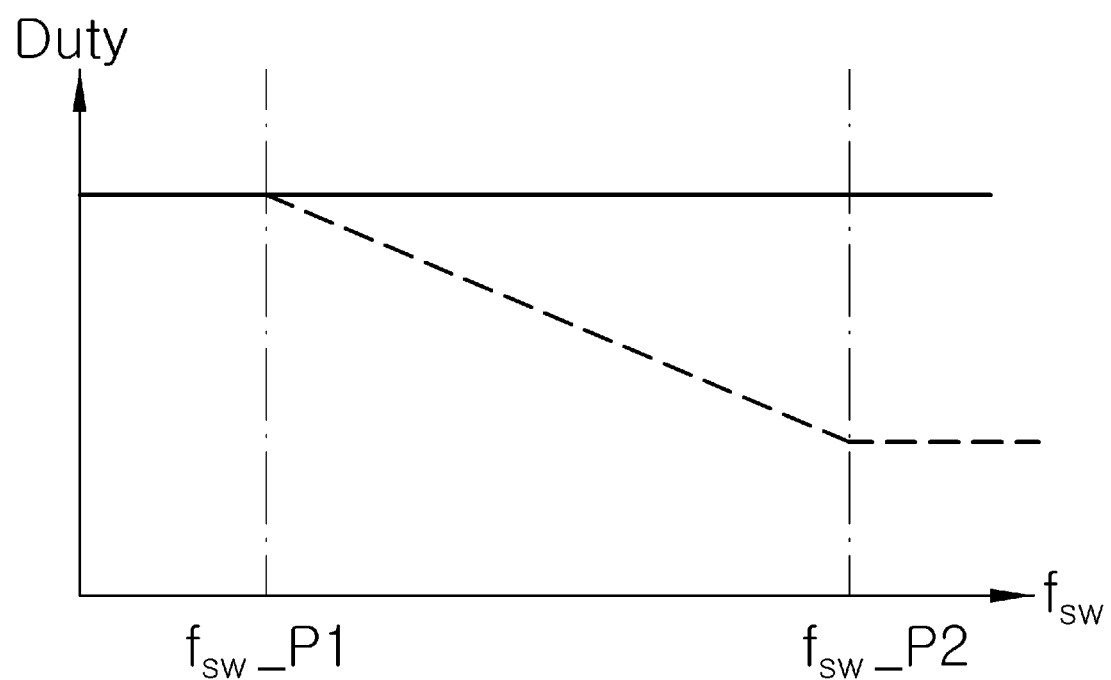
FIGS. 7A and 7B are diagrams illustrating a duty derived by the duty variable controller illustrated in FIG. 6 and a gain curve according thereto.
Figure 7B:
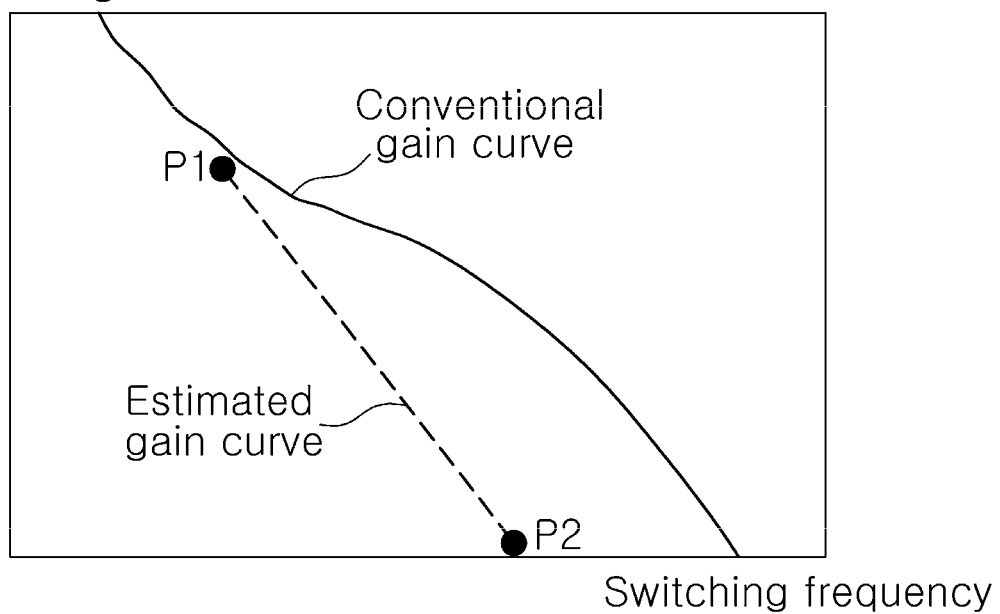

FIG. 7 shows a duty derived by the duty variable controller 320 illustrated in FIG. 6 and a gain curve according to the duty. FIG. 7A is a graph showing a switching duty value determined by the duty variable controller 320 illustrated in FIG. 6 according to a switching frequency and FIG. 7B shows a gain curve when a switch of the converter 310 is controlled using the switching duty value shown in FIG. 7A.

Referring to FIG. 7A, the switching duty value determined by the duty variable controller 320 according to an embodiment of the present disclosure is a constant value when a switching frequency detected by the duty variable controler 320 is equal to or less than a specific value $f_{SW\_}P1$, is a constant value when the switching frequency is equal to or greater than a specific value $f_{SW\_}P2$, and is represented by a straight line connecting $F_{SW\_}P1$ to $F_{SW\_}P2$ when the switching frequency falls within a range of $F_{SW\_}P1$ to $F_{SW\_}P2$. Here, constant values at $F_{SW\_}P1$ and $F_{SW\_}P2$ are different from each other. This means that switches in the converter 310 are controlled using different switching duties depending on detected switching frequencies of the converter 310 instead of being controlled with a specific switching duty in the whole switching frequency region. In this manner, a variable duty can be applied in a switching frequency region having nonlinearity on the gain curve of the converter 310 to improve nonlinearity of the gain curve, as illustrated in FIG. 7B.

Figure 8A:
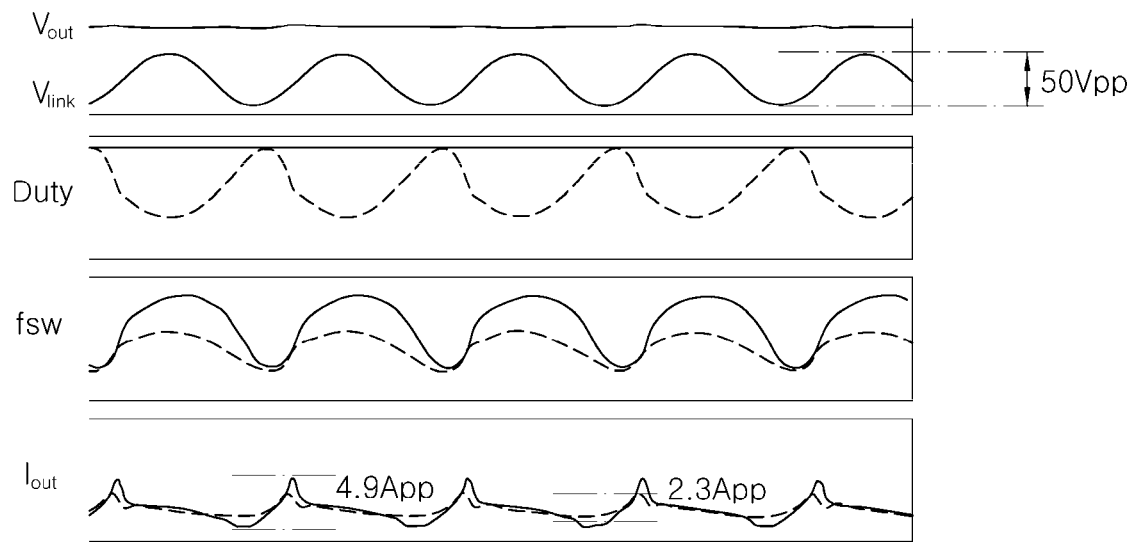
FIGS. 8A and 8B are diagrams showing result values obtained by the converter control device according to an embodiment of the present disclosure.
Figure 8B:
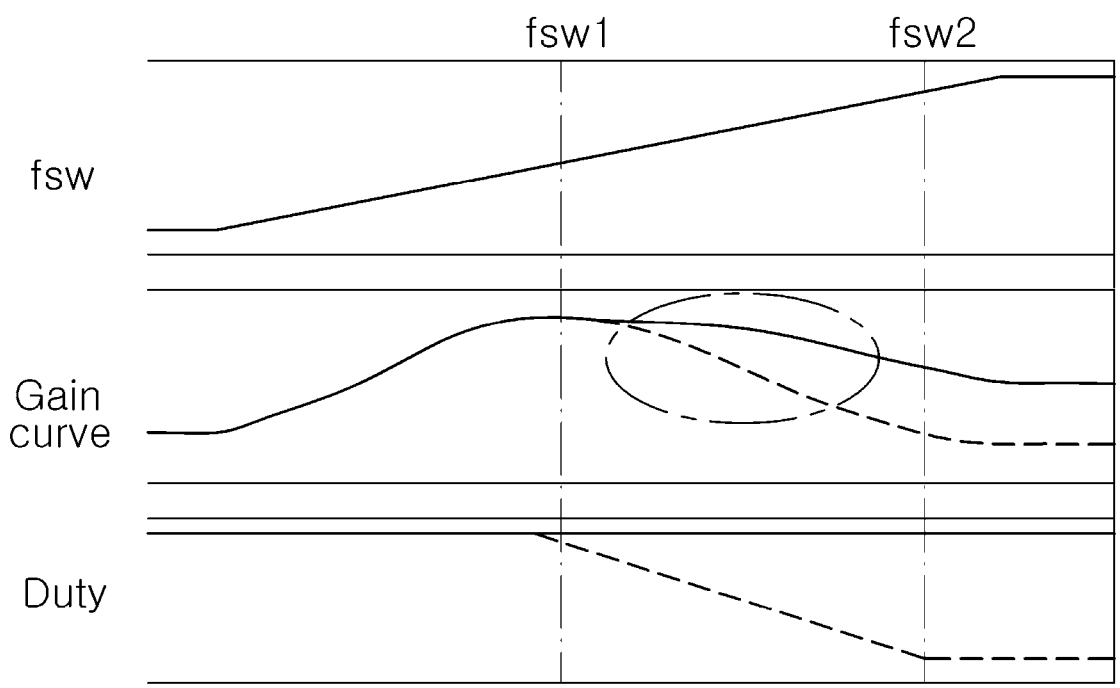

FIG. 8 is a diagram showing result values obtained by the converter control device according to an embodiment of the present disclosure. FIG. 8A comparatively shows result values according to a conventional converter control device and the converter control device according to an embodiment of the present disclosure and FIG. 8B shows output currents according to operations of the conventional converter control device and the converter control device according to an embodiment of the present disclosure.

Referring to FIG. 8A, in a section between switching frequencies fsw1 and fsw2 in which switching frequencies of a conventional converter and the converter 310 according to an embodiment of the present disclosure increase, switches of the conventional converter are controlled using a constant switching duty (e.g., 50% duty) (represented by a solid line), whereas switches of the converter 310 according to an embodiment of the present disclosure are controlled using a gradually decreasing duty (represented by a dotted line). From gain curves obtained by controlling the switches as described above, it can be ascertained that linearity of a gain curve of the converter 310 according to an embodiment of the present disclosure, represented by a dotted line, is improved in the section between the switching frequencies fsw1 and fsw2, as compared to a gain curve of the conventional converter represented by a solid line.

In on/off control of a plurality of switches in the controller 310, the switches can be controlled by changing a switching duty as well as a switching frequency to improve nonlinearity of the gain curve of the converter 310. Accordingly, a low gain can be obtained at a maximum switching frequency and thus technical advantages that a low-load region can be controlled can be achieved.

Referring to FIG. 8B, on condition that input voltages $V_{link}$ of the conventional converter and the converter 310 according to an embodiment of the present disclosure have ripples of 120 Hz at about 50 Vpp, an output current $I_{out}$ has a ripple value of about 4.9 App when switches are controlled using a constant switching duty value in the conventional converter. On the contrary, when the converter 310 is controlled using a variable duty according to the converter control device according to an embodiment of the present disclosure, the output current $I_{out}$ has a ripple value of about 2.3 App. That is, a linearized gain curve can be obtained by controlling the converter 310 using a variable duty and thus ripples of the output current can be reduced.

Figure 9:
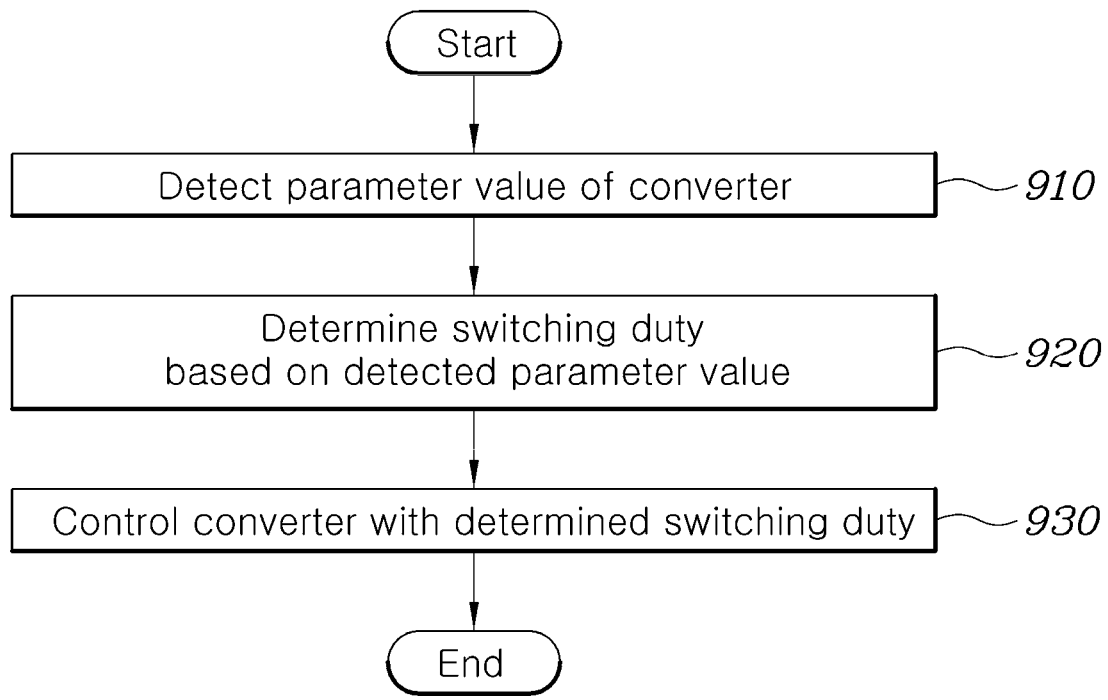
FIG. 9 is a flowchart of a converter control method according to an embodiment of the present disclosure.

FIG. 9 is a flowchart of a converter control method according to an embodiment of the present disclosure. Referring to FIG. 9, the converter control method according to an embodiment of the present disclosure may be performed through step 910 of detecting a parameter value of the converter, step 920 of determining a switching duty based on the detected parameter value, and step 930 of controlling a converter with the determined switching duty.

The converter control method according to an embodiment of the present disclosure may be performed by a single or a plurality of controllers mounted in a vehicle. Alternatively, the converter control method according to an embodiment of the present disclosure may be performed by a single controller, that is, a single integrated controller. In the following description, a controller may be a plurality of controllers or a single integrated controller executing a function.

Such a single or plurality of controllers may be realized in the form of a microcomputer including a processor that executes necessary algorithm processing and arithmetic operations and a memory storing information necessary for algorithm processing and arithmetic operations executed by the processor.

In step 910, a controller detects a parameter value of the converter 310. In an embodiment of the present disclosure, the controller may detect an input voltage applied to the converter and an output voltage output from the converter as parameters related to operation of the converter. In another embodiment of the present disclosure, the controller may detect the switching frequency of the converter 310 as a parameter related to operation of the converter.

In step 920, the controller determines a switching duty of the converter 310 on the basis of the parameter value of the converter 310 detected in step 910.

According to an embodiment of the present disclosure, the controller may determine the switching duty of the converter 310 from the parameter value detected through the following process.

First, the controller applies a scaling value and an offset value to the detected parameter value to derive a corrected parameter value. More specifically, the controller may multiply the detected parameter value by the scaling value and add the offset value thereto to derive the corrected parameter value. In an embodiment of the present disclosure, if the input voltage and the output voltage of the converter 310 are detected in step 910, the controller may divide the output voltage by the input voltage to obtain a gain value of the converter 310 and apply the scaling value and the offset value to the obtained gain value to derive a corrected parameter value.

In an embodiment of the present disclosure, the scaling value and the offset value may be constants predetermined through tests in order to derive a duty value for eliminating nonlinearity of the gain curve of the converter 310 on the basis of parameters detected by the controller. More specifically, the scaling value and the offset value may be determined by finding a duty value for eliminating nonlinearity of the gain curve of the converter 310 such that the gain curve has linear characteristics and finding a scaling value and an offset value by which the duty value can be derived through repeated simulations.

The controller determines a switching duty value corresponding to the corrected parameter value using a predetermined function.

In an embodiment of the present disclosure, the predetermined function outputs different function values according to the corrected parameter value. For example, the predetermined function may output a first constant value as a duty value if the corrected parameter value is equal to or less than a first reference value, output a second constant value as a duty value if the corrected parameter value is equal to or greater than a second reference value, and output a constant value varying according to the corrected parameter value as a duty value if the corrected parameter value is equal to or greater than the first reference value and equal to or less than the second reference value.

The switching duty determined in the present step may have a value on a line connecting a duty value (first constant value) at the first reference value to a duty value (second constant value) at the second reference value on a graph having a parameter value as an x axis and a duty value as a y axis when the corrected parameter value is equal to or greater than the first reference value and equal to or less than the second reference value.

In an embodiment of the present disclosure, the determined switching duty may have a value on a straight line defined as a linear function which connects a duty value (first constant value) at the first reference value to a duty value (second constant value) at the second reference value on a graph having a parameter value as an x axis and a duty value as a y axis when the detected parameter value is equal to or greater than the first reference value and equal to or less than the second reference value.

In step 930, the controller controls a plurality of switching elements of the converter 310 using the switching duty determined in step 920. In an embodiment of the present disclosure, the controller may generate a PWM signal having the determined switching duty value and transmit the generated PWM signal to the switching elements of the converter 310 to control the converter 310 with the determined switching duty value.

According to the converter control method according to an embodiment of the present disclosure, it is possible to improve nonlinearity of the gain curve of the converter 310 by determining a switching duty of a plurality of switching elements of the converter 310 on the basis of parameters (e.g., switching frequency, input voltage, and output voltage) related to operation of the converter and using the switching duty to control the switching elements, to allow low-gain output and reduce output current ripples.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

It is possible to control switches of an LLC resonance converter by changing a switching duty value as well as a switching frequency to improve nonlinearity of the gain curve of the converter and reduce output current ripples.

Furthermore, it is possible to allow low-gain output and secure low-load output by calculating a duty value capable of improving nonlinearity of the gain curve of the LLC resonance converter using the gain or the switching frequency of the converter and controlling the converter using the duty value.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A method for controlling an LLC resonance converter, comprising:
   detecting, via a controller, an input voltage and an output voltage of the converter as parameter values related to operation of the converter;
   determining a switching duty of the converter based on the detected parameter values; and
   controlling the converter with the determined switching duty;
   wherein the determining of the switching duty of the converter comprises:
      calculating a gain value of the converter by dividing the output voltage by the input voltage;
   wherein the determining of the switching duty of the converter further comprises:
      applying a scaling value and an offset value to the calculated gain value to calculate a gain corrected value; and
      determining the switching duty from the gain corrected value using a predetermined function;

wherein the determined switching duty has a first constant value when the gain value is equal to or less than a first reference value, has a second constant value when the gain value is equal to or greater than a second reference value, and has a value on a straight line or a curve passing through the first constant value and the second constant value when the gain value is greater than the first reference value and less than the second reference value; and wherein the first constant value and the second constant value are different values.

2. The method according to claim 1, wherein the scaling value and the offset value are constant values determined by at least one of a current value and a resistance value applied to the converter.

3. The method according to claim 1, wherein the scaling value and the offset value are determined by finding a switching duty value for eliminating nonlinearity of a gain curve of the converter such that the gain curve has linear characteristics and finding a scaling value and an offset value for deriving the switching duty value through repeated simulations.

4. A method for controlling an LLC resonance converter, comprising:

detecting, via a controller, an input voltage and an output voltage of the converter as parameter values related to operation of the converter;

determining a switching duty of the converter based on the detected parameter values; and controlling the converter with the determined switching duty;

wherein the determining of the switching duty of the converter comprises:

calculating a gain value of the converter by dividing the output voltage by the input voltage;

wherein the parameter values include a switching frequency of the converter;

wherein the determining of the switching duty of the converter comprises:

applying a scaling value and an offset value to the switching frequency to calculate a switching frequency corrected value; and determining the switching duty from the switching frequency corrected value using a predetermined function;

wherein the determined switching duty has a third constant value when the switching frequency is equal to or less than a third reference value, has a fourth constant value when the switching frequency is equal to or greater than a fourth reference value, and has a value on a straight line passing through the third constant value and the fourth constant value when the switching frequency is greater than the third reference value and less than the fourth reference value; and wherein the third constant value and the fourth constant value are different values.

5. A device for controlling an LLC resonance converter, comprising:

a converter capable of converting a voltage according to control of switching elements included in the converter; and a duty variable controller for detecting an input voltage and an output voltage of the converter as parameter values related to operation of the converter and determining a switching duty of the switching elements based on the detected parameter values;

wherein the duty variable controller comprises a parameter corrector for applying a scaling value and an offset value to the detected parameter values;

wherein the parameter corrector divides the output voltage by the input voltage to calculate a gain value;

wherein the duty variable controller further comprises:

a parameter detector for detecting the parameter values; and a duty calculator for determining the switching duty from parameter values to which the scaling value and the offset value have been applied using a predetermined function; and wherein the parameter corrector applies the scaling value and the offset value to the calculated gain value.

6. The device according to claim 5, wherein the determined switching duty has a first constant value when the gain value is equal to or less than a first reference value, has a second constant value when the gain value is equal to or greater than a second reference value, and has a value on a curve passing through the first constant value and the second constant value when the gain value is greater than the first reference value and less than the second reference value, and wherein the first constant value and the second constant value are different values.

7. The device according to claim 5, wherein the parameter values include a switching frequency of the converter, wherein the determined switching duty has a third constant value when the switching frequency is equal to or less than a third reference value, has a fourth constant value when the switching frequency is equal to or greater than a fourth reference value, and has a value on a straight line passing through the third constant value and the fourth constant value when the switching frequency is greater than the third reference value and less than the fourth reference value, and wherein the third constant value and the fourth constant value are different values.

* * * * *